(12) United States Patent
Weitenberner et al.

(10) Patent No.: US 10,219,029 B1
(45) Date of Patent: Feb. 26, 2019

(54) DETERMINING ONLINE CONTENT INSERTION POINTS IN AN ONLINE PUBLICATION

(71) Applicant: Google Inc., Mountain View, CA (US)

(72) Inventors: Christian Weitenberner, Venice, CA (US); Yun Shi, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 115 days.

(21) Appl. No.: 14/621,197

(22) Filed: Feb. 12, 2015

Related U.S. Application Data

(60) Provisional application No. 61/951,624, filed on Mar. 12, 2014.

(51) Int. Cl.
| | | |
|---|---|---|
| *H04N 7/10* | (2006.01) | |
| *H04N 7/025* | (2006.01) | |
| *H04N 21/435* | (2011.01) | |
| *H04N 21/44* | (2011.01) | |
| *H04N 21/61* | (2011.01) | |
| *H04N 21/81* | (2011.01) | |

(52) U.S. Cl.
CPC ..... *H04N 21/435* (2013.01); *H04N 21/44016* (2013.01); *H04N 21/6175* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 4,893,197 A | 1/1990 | Howells et al. | |
| 7,272,295 B1 | 9/2007 | Christopher | |
| 7,752,031 B2 | 7/2010 | Childress et al. | |
| 8,069,036 B2 | 11/2011 | Pauws et al. | |
| 8,422,859 B2 | 4/2013 | Zeng | |
| 8,457,975 B2 | 6/2013 | Neuendorf et al. | |
| 2003/0085913 A1 | 5/2003 | Ahmad et al. | |
| 2005/0066352 A1* | 3/2005 | Herley | H04N 7/16 725/19 |
| 2008/0092159 A1* | 4/2008 | Dmitriev | G06Q 30/0269 725/34 |
| 2008/0092182 A1* | 4/2008 | Conant | H04N 7/17318 725/109 |
| 2008/0307454 A1* | 12/2008 | Ahanger | G06Q 30/02 725/36 |

(Continued)

*Primary Examiner* — Mushfikh I Alam
(74) *Attorney, Agent, or Firm* — Foley & Lardner LLP

(57) ABSTRACT

A computer-implemented method for determining online content insertion points in an online publication is provided. The method is implemented using a break point identifying ("BPI") computer device in communication with a memory device. The method includes receiving a candidate online publication that includes a plurality of audio segments, identifying one or more of the plurality of audio segments, determining at least one break candidate within the candidate online publication based on the identification of one or more of the plurality of audio segments, determining at least one content insertion point with the candidate online publication based on the at least one break candidate. Each content insertion point represents a point in the candidate online publication for presenting online content, and store the at least one content insertion point in association with the candidate online publication.

17 Claims, 5 Drawing Sheets

(56) References Cited

U.S. PATENT DOCUMENTS

| | | | |
|---|---|---|---|
| 2009/0222854 A1* | 9/2009 | Cansler | H04N 7/17318 725/35 |
| 2009/0254933 A1* | 10/2009 | Gupta | H04H 20/14 725/14 |
| 2010/0162289 A1* | 6/2010 | Sanders | H04N 21/4758 725/23 |
| 2010/0251289 A1* | 9/2010 | Agarwal | H04N 7/16 725/34 |
| 2011/0145856 A1* | 6/2011 | Agarwal | G06Q 30/02 725/32 |
| 2012/0124618 A1* | 5/2012 | Ruiz-Velasco | G06Q 30/0241 725/32 |
| 2012/0143660 A1* | 6/2012 | Jiwang | G06Q 30/0241 705/14.4 |
| 2012/0308208 A1* | 12/2012 | Karaoguz | G06Q 30/0264 386/249 |
| 2013/0160046 A1* | 6/2013 | Panje | H04N 21/4126 725/32 |
| 2013/0219427 A1* | 8/2013 | Zundel | H04N 21/26258 725/32 |
| 2014/0082651 A1* | 3/2014 | Sharifi | H04N 21/23418 725/20 |
| 2014/0101686 A1* | 4/2014 | Kitts | H04N 21/812 725/14 |
| 2014/0105567 A1 | 4/2014 | Casagrande et al. | |
| 2016/0005081 A1* | 1/2016 | Albl | G06Q 30/0264 705/14.61 |
| 2016/0088332 A1* | 3/2016 | Lind | H04N 21/8113 725/14 |
| 2016/0155001 A1* | 6/2016 | Betley | H04N 21/8549 725/116 |

* cited by examiner

DETERMINING ONLINE CONTENT INSERTION POINTS IN AN ONLINE PUBLICATION

CROSS REFERENCE TO RELATED APPLICATIONS

This application claims the benefit of U.S. Provisional Application No. 61/951,624 filed Mar. 12, 2014, which is hereby incorporated by reference in its entirety.

BACKGROUND

This description relates to online content, and, more particularly, to methods and system for determining insertion points for inserting online content into an online publication.

At least some online publications that are uploaded and shared among online users, such as user-generated video or audio files, provide good opportunities to present other online content, such as advertising materials, to viewers along with the requested publication. For example, at least some video and/or audio publications include multiple "chapters" within a file that are predefined by the publisher of the publication. These chapters are defined by breaks that are, in many cases, strategically placed by the publisher within the video or audio file. These predefined chapters allow for easy insertion of other online content (e.g., video and/or audio ads) within the video and/or audio publication. In addition to being subject to human error, requiring a publisher of an online publication to predefine chapters and insert breaks within an online publication is tedious and time consuming for the publisher. Moreover, known systems for automatically identifying content insertion points within an online publication that does not include predefined chapters are arbitrary and/or imprecise.

BRIEF DESCRIPTION OF THE DISCLOSURE

In one aspect, a computer-implemented method for determining online content insertion points in an online publication is provided. The method is implemented using a break point identifying ("BPI") computer device in communication with a memory device. The method includes receiving a candidate online publication that includes a plurality of audio segments, identifying by the BPI computer device one or more of the plurality of audio segments, determining by the BPI computer device at least one break candidate within the candidate online publication based on the identification of one or more of the plurality of audio segments, and determining at least one content insertion point with the candidate online publication based on the at least one break candidate. Each content insertion point represents a point in the candidate online publication for presenting online content. The method also includes storing the at least one content insertion point in association with the candidate online publication.

In another aspect, a break point identifying ("BPI") computer system for determining online content insertion points in an online publication is provided. The BPI computer system includes one or more processors communicatively coupled to one or more memory devices. The BPI computer system is configured to receive a candidate online publication that includes a plurality of audio segments, identify one or more of the plurality of audio segments, determine at least one break candidate within the candidate online publication based on the identification of one or more of the plurality of audio segments, and determine at least one content insertion point with the candidate online publication based on the at least one break candidate. Each content insertion point represents a point in the candidate online publication for presenting online content. The BPI computer system is also configured to store the at least one content insertion point in association with the candidate online publication.

In yet another aspect, a computer-readable storage medium having computer-executable instructions embodied thereon is provided. When executed by a break point identifying ("BPI") computing device having at least one processor coupled to at least one memory device, the computer-executable instructions cause the at least one processor to receive a candidate online publication that includes a plurality of audio segments, identify one or more of the plurality of audio segments, determine at least one break candidate within the candidate online publication based on the identification of one or more of the plurality of audio segments, and determine at least one content insertion point with the candidate online publication based on the at least one break candidate. Each content insertion point represents a point in the candidate online publication for presenting online content. The computer-executable instructions also cause the at least one processor to store the at least one content insertion point in association with the candidate online publication.

BRIEF DESCRIPTION OF THE DRAWINGS

FIG. 1 is a diagram depicting an example networked environment for presenting and displaying online publications and content.

FIG. 2 illustrates an example configuration of a computing device used for determining insertion points in an online publication for inserting online content into an online publication.

FIG. 3 is a schematic illustration of an example candidate publication managed by a publication management system shown in FIG. 1.

FIG. 4 is a flowchart of a process for determining insertion points for inserting online content into an online candidate publication using the environment shown in FIG. 1.

FIG. 5 is a diagram of a plurality of components of one or more example computing devices, included in the environment shown in FIG. 1.

Figure 1:
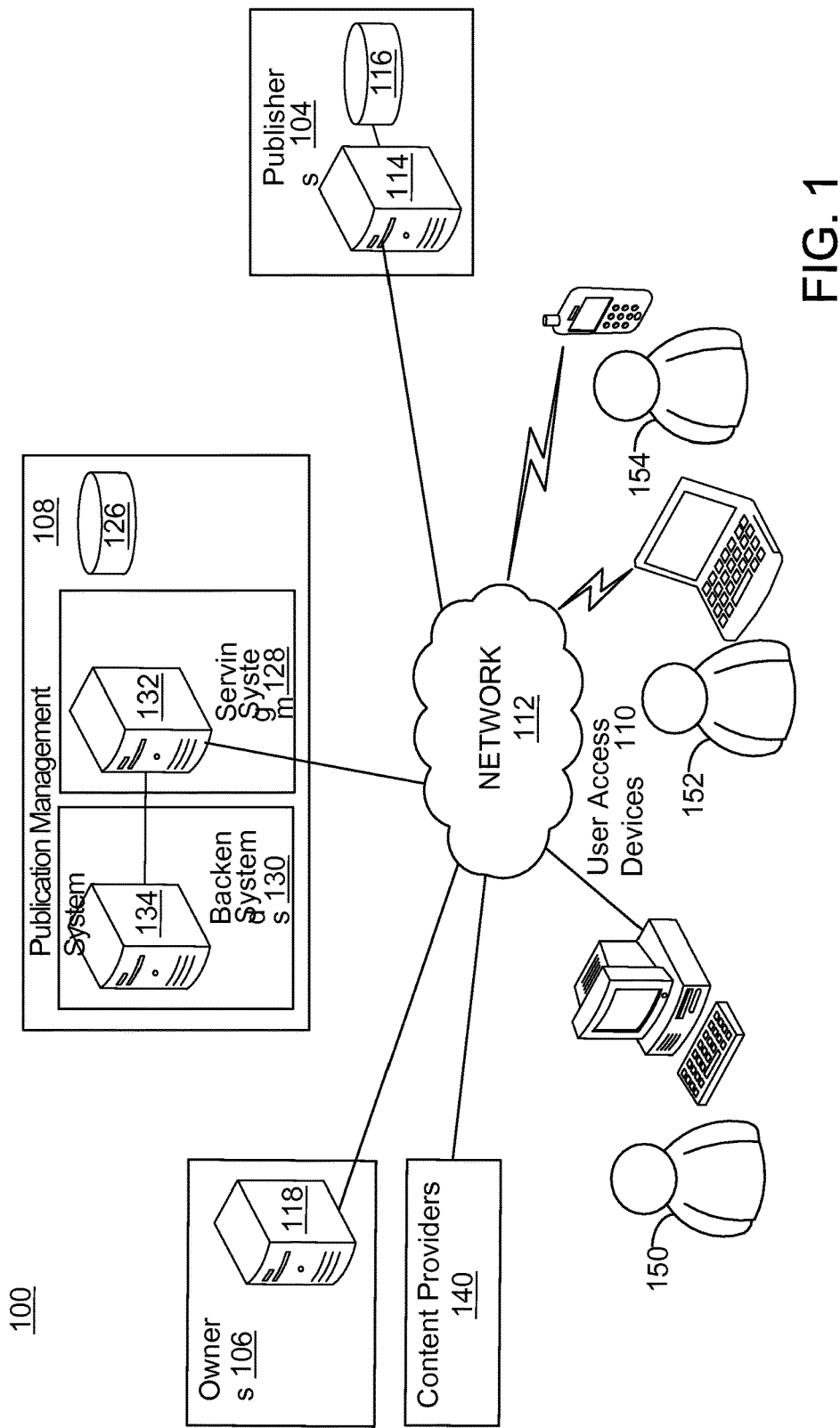
FIGS. 1-5 show example embodiments of the methods and system described herein.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of implementations consistent with the principles of the disclosure refers to the accompanying drawings. The same reference numbers in different drawings may identify the same or similar items. Also, the following detailed description does not limit the embodiments of the disclosure.

Embodiments of the methods and system described herein include automatically determining insertion points in an online publication for inserting and presenting other online content within the online publication. In some embodiments, the online publication is a video and/or audio file that is uploaded, maintained, provided, presented, and/or otherwise processed on a publication management system, such as a system that is configured to host a video sharing website. The publication management system manages a plurality of online publications including video and/or audio, such as movies, television programs, music videos, music, radio shows, news, and live or delayed recordings. The online publications are analyzed to identify a plurality of segments in at least one online publication. For example, in an online publication including a plurality of songs, each song may be identified as a segment.

The publication management system includes a break point identifying ("BPI") computer device. The BPI computer device is a computing device associated with the publication management system. The BPI computer device is configured to scan through a plurality of candidate publications and identify candidate publications that are eligible for mid-roll content. In some embodiments, eligible publications may be identified based on a time and/or duration of the candidate publication. As used herein, "mid-roll" content refers to content that is presented after the beginning of an online presentation is presented to an end user and before the end of candidate publication is presented. In some embodiments, the mid-roll content is presented in an unmovable static area integrated into the candidate publication.

As described herein, candidate publications include a plurality of segments. In the example embodiment, each segment is a portion of audio content, such as a song or an audio book chapter. The BPI computer device is configured to scan candidate publications to identify which candidate publications include a plurality of segments and identify each segment of that plurality of segments. In some embodiments, the BPI computer device is configured to compare each candidate publication with reference publications stored in a database, such as a publication repository, and identify at least one reference publication contained in the candidate publication. In such embodiments, the BPI computer device is configured to identify each segment of the candidate publication that contains a reference publication.

For example, a candidate publication includes a plurality of segments, where each segment is an embedded sound recording (e.g., song 1, song 2, song 3, and song N). In this example, segment 1 contains song 1, segment 2 contains song 2, and segment N contains song N. The BPI computer device identifies a segment within the candidate publication that matches one of the reference publications stored in the database. Thus, if song 1 in segment 1 of the candidate publication matches Reference Song 1 stored in the database, then the BPI computer device identifies segment 1 as being Reference Song 1, stores the identification, and continues identifying segments until all of the reference publications in segments of the candidate publication are identified. In at least some embodiments, the reference publications are submitted to or uploaded to the database by the owner of the copyrights of the reference publications. In some embodiments, different reference publications are associated with different owners. After the BPI computer device has determined that no additional segments of candidate publication are associated with reference publications in the database, the BPI computer device scans the rest of the candidate publication to determine if there are additional segments.

The BPI computer device is configured to determine at least one break candidate based on the identification of the segments in the candidate publication. A break candidate represents a point in the candidate publication between two adjacent segments that may be used for inserting a content item. In some embodiments, the BPI computer device is configured to determine a break candidate at each point between adjacent segments. For example, the BPI computer device may identify a time and/or duration for each segment of a candidate publication based, at least in part, on a time or duration of an associated reference publication. In some embodiments, the BPI computer device is configured to identify a beginning and an end of each segment (also known as a starting point and a stopping point, respectively). For example, the end of a segment may be determined by detecting a video drop out (e.g., a fade towards black or white) and/or an audio drop out (e.g., a decrease in volume). Additionally, the BPI computer device may determine the end of a segment by a change in the tempo or beat of the audio in the segment.

In the example embodiment, the BPI computer device is configured to analyze the break candidates to identify at least one content insertion point for presenting online content. In some embodiments, the content insertion point is identified based on a predetermined algorithm. Factors used to identify the content insertion point include, without limitation, a number of segments in the candidate publication, a time and/or duration of a segment and/or candidate publication, a characteristic (e.g., tempo, volume, tone) of a segment, a request of a publisher of a candidate publication, a request of an owner of an associated reference publication, and a jurisdiction and/or territory associated with a publisher, an owner, and/or an end user.

The BPI computer device may present a predetermined number of content insertion points for each predetermined amount of play time (e.g., no more than one content insertion point for every 3.5 minutes of candidate publication). The BPI computer device may identify a first break candidate between adjacent segments that are dissimilar in tempo, volume, and/or tone as a content insertion point because the first break candidate would be less interruptive to an end user than a second break candidate between adjacent segments that are similar in tempo, volume, and/or tone. The publisher or owner may enable or disable content to be displayed along with a candidate publication. Additionally or alternatively, the owner may assert his or her rights over the candidate publication and supersede a request of the publisher. Laws governing ownership of a candidate publication and/or copyright may vary by jurisdiction. In some embodiments, a first owner may own the rights to a first set of reference publications, while a second owner may own the rights to a second set of reference publications. Each owner may include their own set of rules related to content insertion points, such as the various thresholds described herein. In a candidate publication that contains reference publications associated with both owners, the BPI computer device applies the corresponding set of rules as necessary.

For example, the BPI computer device identifies ten segments in a candidate publication, which provides nine break candidates. The BPI computer device uses the algorithm to identify two content insertion points based on the aforementioned factors. In a different candidate publication with ten segments and nine break candidates, the BPI computer device may use the same algorithm to identify three content insertion points.

In some embodiments, a segment of the candidate publication may not include the entire reference publication. For example, the segment may have been artificially shortened by the publisher. The BPI computer device compares the segment to the associated reference publication to determine what percentage of the reference publication is contained in the segment. If the percentage contained in the segment is greater than a first predetermined threshold, then the BPI computer device marks the segment as containing the reference publication. If the percentage is less than the first predetermined threshold, the BPI computer device determines the beginning and end of the segment and marks the segment as a segment not containing a reference publication. For example, if over 80% of a reference song is contained in the segment, then the BPI computer device marks the segment as containing the reference song. Otherwise, the BPI computer device marks the segment as an unidentified audio segment. The first predetermined threshold may be set by the owner(s) of the reference publication(s).

In some other embodiments, a ratio of the identified segments containing reference publications to the total number of segment in the candidate publication must exceed a second predetermined threshold. For example, if the percentage of segments in the candidate publication containing songs from the database does not exceed 80%, then the BPI computer device disqualifies the candidate publication and does not identify break candidates and content insertion points in the candidate publication. The second predetermined threshold may be set by the owners of the reference publications.

The publication management system is configured to present mid-roll content when a candidate publication reaches a content insertion point. In some embodiments, the publication management system is configured to not present mid-roll content when a candidate publication reaches a content insertion point if at least one predetermined threshold is not satisfied. In one implementation, the publication management system is configured to present a predetermined number of content insertion points for each predetermined amount of play time (e.g., no more than one content insertion point for every 3.5 minutes of candidate publication). In such an implementation, if the content was presented within a 3.5-minute window preceding a content insertion point, the publication management system skips the content insertion point (i.e., the mid-roll content is not presented) and continues presentation of the candidate publication. Alternatively, in such an implementation, if content was not presented within the predetermined time window preceding a content insertion point (i.e., content was played before the window or was not previously played), then the mid-roll content is presented when the candidate publication reaches a content insertion point.

In some embodiments, the publication management system is configured to determine a time and/or duration associated with at least one content insertion point based on a time and/or duration of the candidate publication. For example, if a candidate publication has a play time that is less than a predetermined threshold (e.g., 15 minutes), then the publication management system may determine that a content insertion point has a first play time (e.g., 15 seconds), and if the candidate publication has a play time that is greater than the predetermined threshold, then the publication management system may determine that a content insertion point has a second play time (e.g., 30 seconds). In some embodiments, any number of mid-roll content may be selected to fill a play time associated with content insertion point. For example, if the publication management system determines that a content insertion point has a play time of 30 seconds, then the publication management system may select two 15-second mid-roll contents to fill the 30 seconds of play time.

The methods and system described herein may be implemented using computer programming or engineering techniques including computer software, firmware, hardware, or any combination or subset. As disclosed above, at least one technical problem with known systems is that there is no efficient way to determine content insertion points within an online publication that does not include predefined chapters or segments. The systems and methods described herein address that technical problem. The technical effect of the systems and processes described herein is achieved by performing at least one of the following steps: (a) receive a candidate publication, where the candidate publication includes a plurality of segments; (b) store a plurality of reference audio publications in memory; (c) scan the received candidate publication to determine if any of the plurality of segments match any of the stored plurality of reference audio publications; (d) compare a first percentage of a reference audio publication contained in candidate publication to see if the percentage exceeds a first predetermined threshold; (e) if the first percentage exceeds the first predetermined threshold, identify the segment as containing the reference audio publication; (f) compare a second percentage of identified segments in the candidate publication to see if the second percentage exceeds a second predetermined threshold; (g) if the second percentage exceeds the second predetermined threshold, determine at least one break candidate based on the identified segments; (h) associate at least one content insertion point with candidate publication based on the at least one break candidate; and (i) serve at least one online content item to a user when the content insertion point is reached during playback of the candidate publication. The resulting technical effect is that content insertion points are determined for candidate online publications, so that online content may be inserted during the playback of candidate online publications.

The following detailed description illustrates embodiments of the disclosure by way of example and not by way of limitation. It is contemplated that the disclosure has general application to automatically identifying content insertion points for presenting online content in an online publication.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

FIG. 1 is a diagram depicting an example networked environment 100 for presenting and displaying online publications and content. Example networked environment 100 may include one or more publishers 104, one or more owners 106, a publication management system 108, and one or more user access devices 110 ("client computing devices"), which may be coupled to a network 112. User access devices 110 are used by end users 150, 152, and 154. Each of the elements 104, 106, 108, 110 and 112 in FIG. 1 may be implemented or associated with hardware components, software components, or firmware components or any combination of such components. The elements 104, 106, 108, 110 and 112 can, for example, be implemented or associated with servers, software processes and engines, and/or various embedded systems.

The publishers 104 may include any entity that generates, uploads, maintains, provides, presents, and/or otherwise processes online publications in environment 100. The term "publication" refers to various types of web-based, software application-based, and/or otherwise presented information including documents, video and/or audio files, such as movies, television programs, music videos, music, radio shows, news, live or delayed recordings, or any other form of information that may be presented to an end user 150, 152, or 154 using a computing device such as one of user access devices 110. In some embodiments, a publisher 104 provides and/or uploads a publication that includes a plurality of segments. For example, the publication may include at least a portion of a movie including a plurality of scenes, at least a portion of an album including a plurality of songs, and/or at least a portion of an audiobook including a plurality of chapters. Although these publications may include a plurality of segments, these publications do not include predefined embedded breaks within the publication that are embedded by the publisher.

The publishers 104 may include or maintain one or more data processing systems 114, such as servers or embedded systems, coupled to the network 112. They may include or maintain one or more processes that run on data processing systems. In some examples, the publishers 104 may include one or more publication repositories 116 for storing publications and other information.

The owners 106 may include any entity that has rights, copyright or other, in the generating, uploading, maintaining, providing, presenting, and/or otherwise processing of a publication in environment 100. The owners 106 may include or maintain one or more data processing systems 118, such as servers or embedded systems, coupled to the network 112. They may include or maintain one or more processes that run on data processing systems. At least some owners 106 generate, upload, maintain, provide, present, and/or otherwise process online publications in environment 100 and, thus, also operate as publishers 104. That said, as is the case with at least some user-generated content, not all publishers 104 are owners 106 of the online publications they generate, upload, maintain, provide, present, and/or otherwise process.

Publication management system 108 enables the publishers 104 to upload, maintain, provide, present, and/or otherwise process online publications in environment 100. Publication management system 108 manages publications and provides various services to the publishers 104 and/or any of the end users 150, 152, 154. Publication management system 108 may store publications in one or more publication repositories 126 and facilitate the distribution or selective provision and recommendation of online publications through environment 100 to the user access devices 110.

Publication management system 108 may include a serving system 128 and one or more backend processing systems 130. The serving system 128 may include one or more data processing systems 132 and may perform functionality associated with delivering online publications and/or content to the user access devices 110. The backend processing systems 130 may include one or more data processing systems 134 and may perform functionality associated with identifying relevant online publications to deliver, processing various rules, performing filtering processes, generating reports, maintaining accounts and usage information, and other backend system processing. Publication management system 108 can use the backend processing systems 130 and the serving system 128 to selectively provide and/or recommend relevant publications from the publishers 104 to the user access devices 110. In some embodiments, publication management system 108 may receive requests from the user access devices 110 (or other elements in environment 100) and provide or present publications to the requesting devices. In some embodiments, publication management system 108 may allow the end users 150, 152, 154 to search through publications in the publication repository 126 and select certain publications for display. In some embodiments, a particular online publication may be recommended to a particular end user 150, 152, or 154 based on user information and behavior, such as particular search queries performed on a search engine website.

Publication management system 108 may include or access one or more crawling, indexing, and searching modules (not shown). These modules may browse the publication repositories 126 to identify, index, and store information. The modules may browse information and create copies of the browsed information for subsequent processing. The modules may also check links, validate code, harvest information, and/or perform other maintenance or other tasks.

The search modules may employ one or more known search or other processes to search data. In some implementations, the search modules may index crawled publications to build one or more search indices. The search indices may be used to facilitate rapid retrieval of information relevant to a search query. Searching modules may also store search results including one or more of search query terms, search results elements, and publications served.

Publication management system 108 may include one or more interface or frontend modules for providing the various features to the publishers 104 and/or any of the end users 150, 152, 154. For example, publication management system 108 may provide one or more publisher frontend interfaces for allowing publishers 104 to interact with publication management system 108. Publication management system 108 may also provide one or more end user frontend interfaces for allowing end users 150, 152, 154 to interact with publication management system 108. In some examples, the frontend interfaces may be configured as web applications that provide users with network access to features available in publication management system 108.

"Computing devices," for example user access devices 110, may include any devices capable of receiving information from the network 112. The user access devices 110 could include general computing components and/or embedded systems optimized with specific components for performing specific tasks. Examples of user access devices 110 include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices, and the like. The user access devices 110 can also include various other elements, such as processes running on various machines.

The network 112 may include any element or system that facilitates communications among and between various network nodes, such as elements 110, 114, 118, 132, and 134. The network 112 may include one or more telecommunications networks, such as computer networks, telephone or other communications networks, the Internet, etc. The network 112 may include a shared, public, or private data network encompassing a wide area (e.g., WAN) or local area (e.g., LAN). In some implementations, the network 112 may facilitate data exchange by way of packet switching using the Internet Protocol (IP). The network 112 may facilitate wired and/or wireless connectivity and communication.

For purposes of explanation only, certain aspects of this disclosure are described with reference to the discrete elements illustrated in FIG. 1. The number, identity, and arrangement of elements in environment 100 are not limited to what is shown. For example, environment 100 can include any number of geographically dispersed publishers 104 and/or user access devices 110, which may be discrete, integrated modules or distributed systems. Similarly, environment 100 is not limited to a single publication management system 108 and may include any number of integrated or distributed publication management systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

For example, in at least some embodiments, environment 100 includes content providers 140 (alternatively referred to herein as merchants), which may be coupled to the network 112. In the example embodiment, content providers 140 include online advertisers. The content providers 140 may include any entities that are associated with content. In some embodiments, the content includes any form of communication in which one or more products, services, ideas, messages, people, organizations, or other items are identified and promoted (or otherwise communicated). Content is not limited to advertisements and commercial promotions. Rather, content may include public service announcements or any other type of notices, such as public notices published in printed or electronic press or broadcasts.

Content may be communicated via various media and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

The content providers 140 may provide (or be otherwise associated with) products and/or services related to content. The content providers 140 may include or be associated with, for example, retailers, wholesalers, warehouses, manufacturers, distributors, health care providers, educational establishments, financial establishments, technology providers, energy providers, utility providers, or any other product or service providers or distributors.

In addition to managing publications, publication management system 108 may be configured to integrate or combine online publications with content that is related or relevant to the publication for display to users 150, 152, and 154. The relevant content may be provided from the content providers 140 and may be combined with a publication provided from the publishers 104 for display to users 150, 152, and 154. In some examples, publication management system 108 may retrieve an online publication for display on a particular user access device 110 and then forward the online publication to the user access device 110 along with code that causes content from publication management system 108 to be displayed to the user 150, 152, or 154. In other examples, publication management system 108 may retrieve a publication, retrieve relevant content, and then integrate the content and the publication to form an integrated publication for display to the user 150, 152, or 154.

In still other examples, publication management system 108 may provide online content space for sale to advertisers, such as content providers 140. Such content space may be populated with online content items from the content providers 140, and may be presented to the user 150, 152, or 154 along with the publications.

In some examples, publication management system 108 may crawl publications provided by the publishers 104 and deliver content that is relevant to the publications and/or publisher audiences. Additionally, publication management system 108 may crawl content provided by the content provider 140 and deliver an online publication that is relevant to content and/or content audiences. Publication management system 108 may allow the publishers 104 to search and select specific products and services as well as associated content to be displayed with publications provided by the publishers 104. For example, the publishers 104 may search through content in the publication repository 126 and select certain content for display with their publications. Additionally, publication management system 108 may allow the content providers 140 to search and select specific online publications to insert content into.

Figure 2:
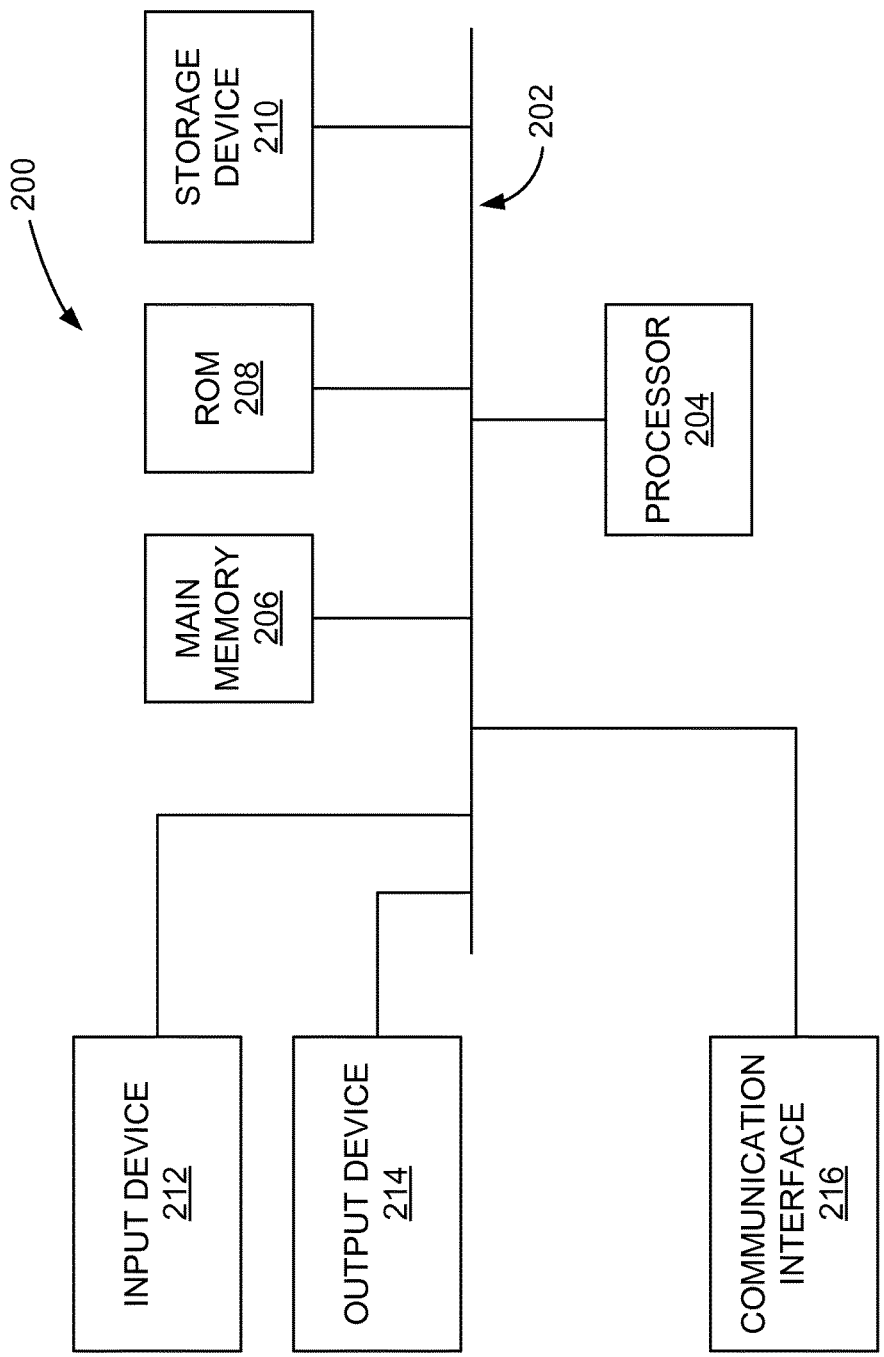

FIG. 2 illustrates an example configuration of a computing device 200 used for determining insertion points in an online publication for inserting online content into the online publication. More specifically, computing device 200 is associated with publication management system 108 (shown in FIG. 1) and is configured to determine insertion points in an online publication, such as a video publication. In the example embodiments, computing device 200 may be associated with, or may be a part of, publication management system 108, such as backend processing system 130 and serving system 128 (both shown in FIG. 1). In other embodiments, computing device 200 is associated with a third party and is merely in communication with publication management system 108. In additional embodiments, computing device 200 could be user access device 110 or any of data processing devices 114, 118, 132, or 134 (all shown in FIG. 1).

Computing device 200 is intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, tablet, phablet, and other similar computing devices that could be used for generating, uploading, maintaining, providing, presenting, and/or otherwise processing online publications. The components shown here, their connections and relationships, and their functions are meant to be examples only and are not meant to limit implementations of the subject matter described and/or claimed in this document.

Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within computing device 200, including instructions stored in the memory 206 or on storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system). In some embodiments, processor 204 is transformed into a special-purpose microprocessor by executing computer-executable instructions or by otherwise being programmed.

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. Storage device 210 is capable of providing mass storage for computing device 200. In one implementation, storage device 210 may be or contain a computer-readable medium, such as a floppy disk device, a hard disk device, an optical disk device, or a tape device, a flash memory or other similar solid state memory device, or an array of devices, including devices in a storage area network, cloud-based storage, or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, storage device 210, or memory on processor 204.

A high-speed controller manages bandwidth-intensive operations for computing device 200, while a low-speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In one implementation, low-speed controller is coupled to storage device 210 and a low-speed expansion port. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device 212 may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 112 (shown in FIG. 1).

As described herein, computing device 200 facilitates automatically identifying content insertion points in an online publication for presenting online content. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

Computing device 200 may be implemented in a number of different forms, as shown in FIG. 2. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

Processor 204 can execute instructions within computing device 200, including instructions stored in main memory 206. The processor may be implemented as chips that include separate and multiple analog and digital processors. The processor may provide, for example, for coordination of the other components of computing device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. Computing device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communication under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth®, WiFi, or other such transceiver (not shown). In addition, a GPS (Global Positioning system) receiver module may provide additional navigation- and location-related wireless data to computing device 200, which may be used as appropriate by applications running on computing device 200.

Computing device 200 may also communicate audibly using an audio codec, which may receive spoken information from a user and convert it to usable digital information.

The audio codec may likewise generate audible sound for a user, such as through a speaker, e.g., in a handset of device. Such sound may include sound from voice telephone calls, may include recorded sound (e.g., voice messages, music files, etc.), and may also include sound generated by applications operating on computing device 200.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 200) that includes a backend component (e.g., as a data server), or that includes a middleware component (e.g., an application server), or that includes a frontend component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing device 200 is configured to automatically identify content insertion points in an online publication for presenting online content based on a predefined algorithm that may be stored within main memory 206 or storage device 210 or may be otherwise received through communications interface 216.

Figure 3:
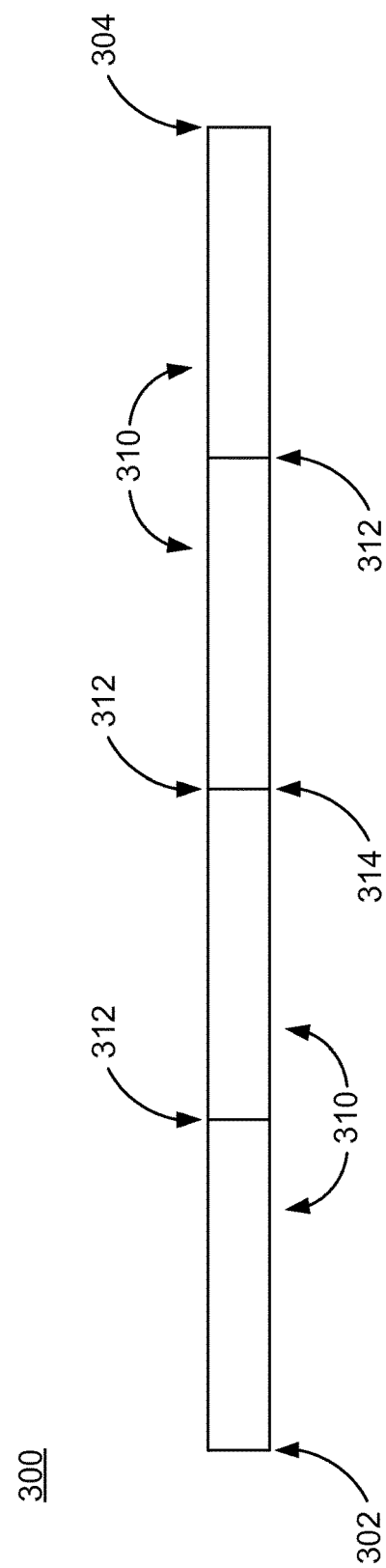

FIG. 3 is a schematic illustration of an example candidate publication 300 (also known as an online publication) managed by publication management system 108 shown in FIG. 1. In the example embodiment, example candidate publication 300 includes a video publication as described herein. Publication management system 108 includes a break point identifying ("BPI") computer device. The BPI computer device is a computing device 200 (shown in FIG. 2) associated with publication management system 108, such as data processing system 134 which is associated with back-end processing system 130 (all shown in FIG. 1). In the example embodiment, the BPI computer device is a part of publication management system 108, while in other embodiments, the BPI computer device is in communication with publication management system 108 to provide publication management system 108 with content insertion points 314 for candidate publications 300.

The BPI computer device is configured to scan through a plurality of candidate publications 300 and identify candidate publications 300 that are eligible for mid-roll content. In some embodiments, eligible publications may be identified based on a time and/or duration of candidate publication 300. As used herein, "mid-roll" content refers to content that is presented after a beginning 302 of an online presentation 300 is presented to an end user and before an end 304 of candidate publication 300 is presented. In some embodiments, the mid-roll content is presented in an unmovable static area integrated into candidate publication 300.

As described herein, candidate publications 300 include a plurality of segments 310. In the example embodiment, each segment 310 is a portion of audio content, such as a song or an audio book chapter. The BPI computer device is configured to scan candidate publications 300 to identify which candidate publications 300 include a plurality of segments 310 and identify each segment 310 of that plurality of segments 310. In some embodiments, the BPI computer device is configured to compare each candidate publication 300 with reference publications stored in publication repository 126 (shown in FIG. 1) and identify at least one reference publication contained in candidate publication 300. In such embodiments, the BPI computer device is configured to identify a each segment 310 of candidate publication 300 that contains a reference publication.

For example, candidate publication 300 includes a plurality of segments, where each segment is an embedded sound recording (e.g., song 1, song 2, song 3, and song N). In this example, a first segment 320 contains song 1, a second segment 322 contains song 2, a third segment 324 contains song 3, and a last segment 326 contains song 4. The BPI computer device identifies a segment 310 within candidate publication 300 that matches one of the reference publications stored in the publication repository 126. Thus, if song 1 in the first segment 320 of candidate publication 300 matches Reference Song 1 stored in publication repository 126, then the BPI computer device identifies first segment 320 as containing Reference Song 1, stores the identification, and continues identifying segments until all of the segments in candidate publication 300 are identified. In this example, the BPI computer device identifies second segment 322 as containing Reference Song 2. However if song 3 and song 4 are not in publication repository 126, then the BPI computer device scans third segment 324 and fourth segment 326 to determine if they are one segment 310 or separate segments 310 and to determine where any break candidates 312 might be between third segment 324 and fourth segment 326.

In at least some embodiments, the reference publications are submitted to or uploaded to the publication repository 126 by owners 106, who own or license the rights to the reference publications. In some embodiments, different reference publications are associated with different owners 106. After the BPI computer device has determined that no additional segments of candidate publication 300 are associated with reference publications in publication repository 126, the BPI computer device scans the rest of candidate publication 300 to determine if there are additional segments.

The BPI computer device is configured to determine at least one break candidate 312 based on the identification of the segments 310 in candidate publication 300. In some embodiments, the BPI computer device is configured to determine a break candidate 312 at each point between adjacent segments 310. For example, the BPI computer device may identify a time and/or duration for each segment 310 of candidate publication 300 based, at least in part, on a time or duration of an associated reference publication. In some embodiments, the BPI computer device is configured to identify a beginning and an end of each segment 310 segment (also known as a starting point and a stopping point, respectively). For example, the end of segment 310 may be determined by detecting a video drop out (e.g., a fade towards black or white) and/or an audio drop out (e.g., decrease in volume). Additionally, the BPI computer device may determine the end of segment 310 by a change in the tempo or beat of the audio in segment 310.

In the example embodiment, the BPI computer device is configured to analyze break candidates 312 to identify at least one content insertion point 314 for presenting online content. In some embodiments, content insertion point 314 is identified based on a predetermined algorithm. Factors used to identify content insertion point 314 include, without limitation, a number of segments 310 in candidate publication 300, a time and/or duration of a segment 310 and/or candidate publication 300, a characteristic (e.g., tempo, volume, tone) of a segment 310, a request of a publisher 104 of candidate publication 300, a request of an owner 106 of an associated reference publication, and a jurisdiction and/or territory associated with a publisher 104, an owner 106, and/or an end user 150, 152, or 154.

The BPI computer device may present a predetermined number of content insertion points for each predetermined amount of play time (e.g., no more than one content insertion point for every 3.5 minutes of candidate publication 300). The BPI computer device may identify a first break candidate 312 between adjacent segments 310 that are dissimilar in tempo, volume, and/or tone as a content insertion point because the first break candidate would be less interruptive to an end user 150, 152, or 154 than a second break candidate 312 between adjacent segments 310 that are similar in tempo, volume, and/or tone. Publisher 104 or owner 106 may enable or disable content to be displayed along with candidate publication 300. Additionally or alternatively, owner 106 may assert his or her rights over candidate publication 300 and supersede a request of publisher 104. Laws regarding ownership of a candidate publication 300 and/or copyright may vary by jurisdiction. In some embodiments, a first owner 106 may own the rights to a first set of reference publications, while a second owner 106 may own the rights to a second set of reference publications. Each owner 106 may include their own set of rules related to content insertion points, such as the various thresholds described herein. In a candidate publication 300 that contains reference publications associated with both owners, the BPI computer device applies the corresponding set of rules as necessary.

For example, the BPI computer device identifies ten segments 310 in a candidate publication (not shown), which provides nine break candidates 312. The BPI computer device uses the algorithm to identify two content insertion points 314 based on the above mentioned factors. In a different candidate publication (not shown) with ten segments 310 and nine break candidates 312, the BPI computer device uses the same algorithm to identify three content insertion points 314.

In some embodiments, candidate publication 300 may not include the entire reference publication. For example, segment 310 may have been artificially shortened by publisher 104. The BPI computer device compares segment 310 to the associated reference publication to determine what percentage of the reference publication is contained in segment 310. If the percentage contained in segment 310 is greater than a first predetermined threshold, then the BPI computer device marks segment 310 as containing the reference publication. If the percentage is less than the first predetermined threshold, the BPI computer device determines the beginning and end of segment 310 and marks segment 310 as a segment not containing a reference publication. For example, if over 80% of a reference song is contained in segment 310, then the BPI computer device marks segment 310 as containing the reference song. Otherwise, the BPI computer device marks the segment as an unidentified audio segment. The first predetermined threshold may be set by owners 106 of the reference publications.

In some other embodiments, a ratio of the identified segments 310 containing reference publications to the total number of segment 310 in candidate publication 300 must exceed a second predetermined threshold to be considered a valid candidate publication 300 for inserting mid-roll content. For example, if the percentage of segments 310 in candidate publication 300 containing songs from publication repository 126 does not exceed 80%, then the BPI computer device disqualifies candidate publication 300 and does not identify break candidates 312 and content insertion points 314 in candidate publication 300. The second predetermined threshold may be set by owner(s) 106 of the reference publication(s).

Publication management system 108 is configured to present mid-roll content when a candidate publication 300 reaches a content insertion point 314. In some embodiments, publication management system 108 is configured to not present mid-roll content when a candidate publication 300 reaches a content insertion point 314 if at least one predetermined threshold is not satisfied. In one implementation, publication management system 108 is configured to present a predetermined number of content insertion points for each predetermined amount of play time (e.g., no more than one content insertion point for every 3.5 minutes of candidate publication 300). In such an implementation, if mid-roll content was presented within a 3.5-minute window preceding a content insertion point 314, publication management system 108 skips content insertion point 314 (i.e., the mid-roll content is not presented) and continues presentation of candidate publication 300. Alternatively, in such an implementation, if mid-roll content was not presented within the predetermined time window preceding a content insertion point 314 (i.e., mid-roll content was played before the window or was not previously played), then the mid-roll content is presented when candidate publication 300 reaches content insertion point 314.

In some embodiments, publication management system 108 is configured to determine a time and/or duration associated with at least one content insertion point 314 based on a time and/or duration of candidate publication 300. For example, if a publication 300 has a play time that is less than a predetermined threshold (e.g., 15 minutes), then publication management system 108 may determine that a content insertion point 314 has a first play time (e.g., 15 seconds), and if candidate publication 300 has a play time that is greater than the predetermined threshold, then publication management system 108 may determine that a content insertion point 314 has a second play time (e.g., 30 seconds). In some embodiments, any number of mid-roll content may be selected to fill a play time associated with content insertion point 314. For example, if publication management system 108 determines that a content insertion point 314 has a play time of 30 seconds, then publication management system 108 may select two 15-second mid-roll contents to fill the 30 seconds of play time.

Figure 4:
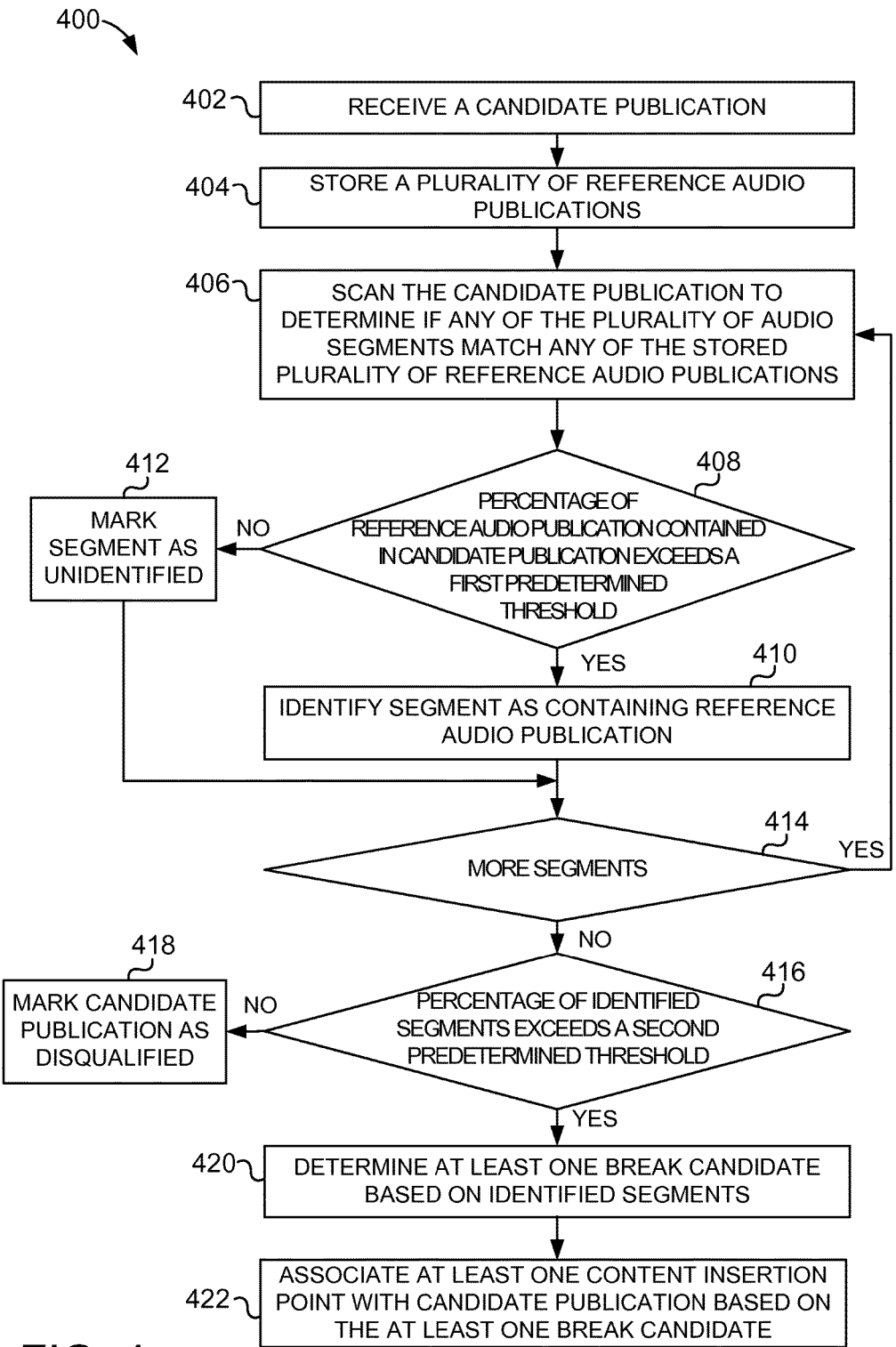

FIG. 4 is a flowchart of a process 400 of for determining insertion points for inserting online content into an online candidate publication 300 (shown in FIG. 3) using environment 100 shown in FIG. 1. In the example embodiment, process 400 is performed by a BPI computer device, which is a computing device 200 (shown in FIG. 2) and associated with publication management system 108. The BPI computer device could be data processing system 134 associated with backend processing system 130 (all shown in FIG. 1).

The BPI computer device receives 402 a candidate publication 300. Candidate publication 300 includes a plurality of segments 310 (shown in FIG. 3), where segments 310 contain audio publications such as songs. In the example embodiment, the BPI computer device receives 402 candidate publication 300 from a publisher 104 (shown in FIG. 1). For example, if publisher 104 uploads a file including a plurality of embedded audio recordings to a video-sharing website, then the file may be identified as a candidate publication 300 eligible for mid-roll content. The BPI computer device stores 404 a plurality of reference audio publications in memory, such as in publication repository 126 (shown in FIG. 1). In the example embodiment, the stored plurality of reference audio publications are provided by one or more owners 106 (shown in FIG. 1). While in the example embodiment, the reference publications are audio, in other embodiments, the reference publications could be video or a combination of audio and video.

The BPI computer device scans 406 the received candidate publication 300 to determine if any of segments 310 match any of the stored plurality of reference audio publications. When the BPI computer device determines a match, the BPI computer device compares 408 the percentage of a reference audio publication contained in candidate publication 300 to see if the percentage exceeds a first predetermined threshold. In the example embodiment, the first predetermined threshold is set by owner 106 of the associated reference audio publication. If the BPI computer device determines that the percentage exceeds the first predetermined threshold, the BPI computer device identifies 410 the segment as containing the reference audio publication. If the BPI computer device determines that the percentage does not exceed the first predetermined threshold, the BPI computer device marks 412 segment 310 as unidentified or not contained in the plurality of reference publications. The BPI computer device determines 414 if there are more possible segments in candidate publication 300. If the BPI computer device determines that there are more possible segments to identify, the BPI computer device returns to Step 406.

If the BPI computer device determines that there are no more possible segments to identify, the BPI computer device compares 416 the percentage of identified segments 310 in candidate publication 300 to see if the percentage exceeds a second predetermined threshold. In some embodiments, the BPI computer device compares the length of the identified segments 310 to the total length of candidate publication 300. In other embodiments, the BPI computer device compares the number of identified segments 310 to the total number of segments 310 in candidate publication 300. If the BPI computer device determines that the percentage of identified segments 310 does not exceed the predetermined threshold, the BPI computer device marks 418 candidate publication 300 as disqualified and continues to the next candidate publication 300.

If the BPI computer device determines that the percentage of identified segments 310 exceeds the predetermined threshold, the BPI computer device determines 420 at least one break candidate 312 (shown in FIG. 3) based on the identified segments 310. In some embodiments, a break candidate 312 is determined and/or identified at each point between adjacent segments 310. For example, time between adjacent audio recordings (e.g., between the end of a preceding song and the beginning of a succeeding song) may be identified as a break candidate 312. The BPI computer device associates 422 at least one content insertion point 314 with candidate publication 300 based on the at least one break candidate 312. This determination of whether a break candidate 312 is a content insertion point 314 is based on any of a number of factors including, without limitation, a number of segments 310 in candidate publication 300, a time and/or duration of a segment 310 and/or candidate publication 300, a characteristic of a segment 310, a request of a publisher 104 of candidate publication 300, a request of an owner 106 of an associated reference publication, and a jurisdiction and/or territory associated with a publisher 104, an owner 106, and/or an end user 150, 152, and/or 154 (shown in FIG. 1). The BPI computer device stores the associated at least one content insertion point so that when the BPI computer device serves candidate publication 300 to a user 150, 152, and 154, the BPI computer device uses the at least one content insertion point to present mid-roll content to the user(s) 150, 152, and/or 154.

In some embodiments, candidate publication 300 is presented to the end user 150, 152, or 154 at user access device 110. The content insertion points 314 provides a logical place for mid-roll content to be presented. For example, when candidate publication 300 reaches a content insertion point 314 (e.g., after a first song and before a second song), the BPI computer device stops and/or pauses candidate publication 300 and presents mid-roll content to the end user 150, 152, or 154. After the mid-roll content is presented, candidate publication 300 resumes until the next content insertion point 314 and/or the end of candidate publication 300. Alternatively, when candidate publication 300 reaches a content insertion point 314 or some other predetermined point relative to content insertion point 314 (e.g., a predetermined number of seconds before or after the content insertion point 314), the BPI computer device may present mid-roll content to the end user 150, 152, or 154 while candidate publication 300 is being presented.

Figure 5:
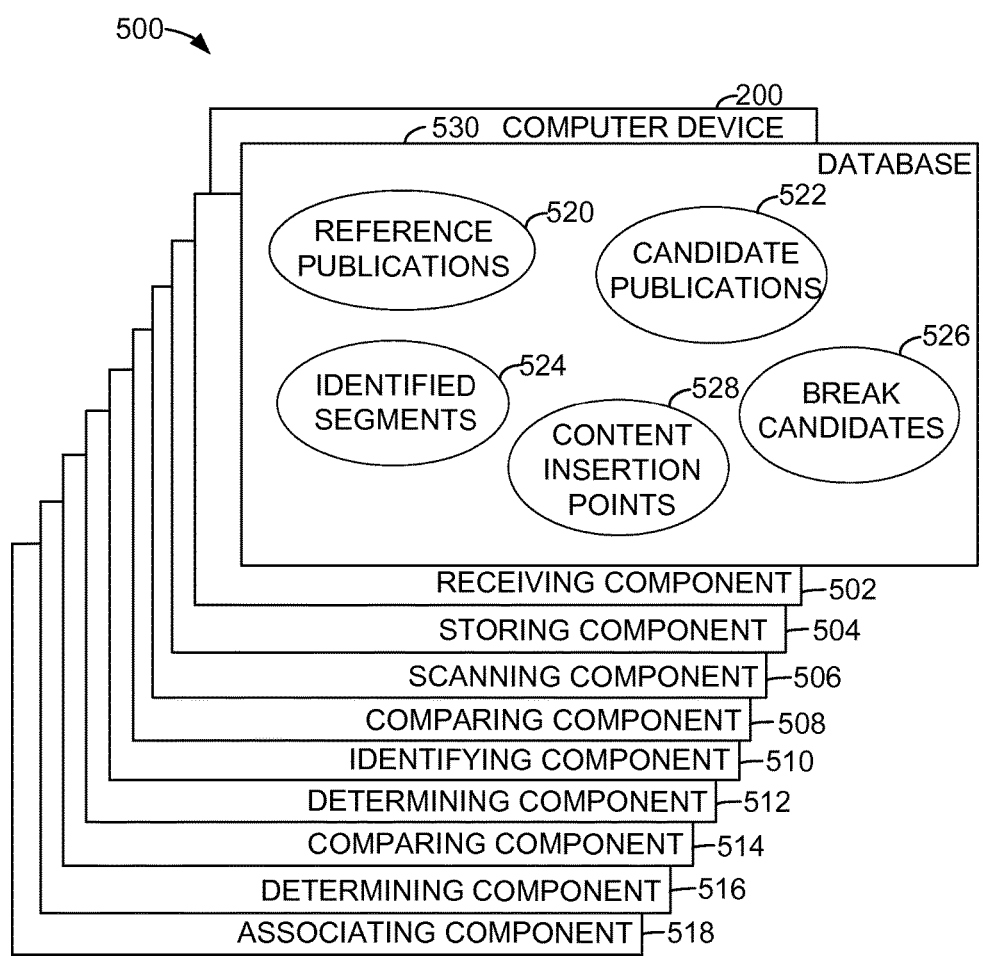

FIG. 5 is a diagram 500 of a plurality of components of one or more example computing devices 200 (shown in FIG. 2) included in environment 100 shown in FIG. 1. For example, one or more of computing devices 200 may be associated with publication management system 108, such as data processing system 134 associated with backend processing system 130 or data processing system 132 associated with serving system 128, all shown in FIG. 1. Computer device 200 may be a BPI computer device. FIG. 5 further shows a configuration of a database 530 contained within computing device 200.

Computing device 200 includes receiving component 502 for receiving a candidate publication 300 (shown in FIG. 3), as described with reference to step 402 (FIG. 4). Computing device 200 also includes a storing component 504 for storing a plurality of reference audio publications, as described with reference to step 404 (FIG. 4). Computing device 200 further includes a scanning component 506 to scan candidate publication 300, as described with reference to step 406 (FIG. 4). Moreover, computing device 200 includes a comparing component 508 for comparing the percentage of reference audio publication contained in candidate publication 300, as described with reference to step 408 (FIG. 4). In addition, computing device 200 includes an identifying component 510 to identify segment 310 (shown in FIG. 3) as containing the reference audio publication, as described with reference to step 410 (FIG. 4). Computing device 200 also includes a determining component 512 for determining if candidate publication 300 contains more segments 310 to scan, as described with reference to step 414 (FIG. 4). Computing device 200 further includes a comparing component 514 for comparing the percentage of identified segments 310 contained in candidate publication 300 exceeds a second predetermined threshold, as described with reference to step 416 (FIG. 4). Moreover, computing device 200 includes a determining component 516 to determine at least one break candidate 312 (shown in FIG. 3) based on identified segments 310, as described with reference to step 420 (FIG. 4). In addition, computing device 200 includes an associating component 518 for associating at least one content insertion point 314 (shown in FIG. 3) with candidate publication 300, as described with reference to step 422 (FIG. 4).

In an example embodiment, database 530 is divided into a plurality of sections, including but not limited to, a reference publications section 520 that may include reference audio publications, a candidate publications section 522 that may include received candidate publications 300, an identified segments section 524 that may include identified segments 310, a break candidates section 526 that may include break candidates 314, and a content insertion points section 528 that may include content insertion points 314. These sections within database 530 are interconnected to perform the functions described above.

Described herein are computer systems such as a publication management system and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the embodiments or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" "retrieving" "receiving" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

While the disclosure has been described in terms of various specific embodiments, it will be recognized that the disclosure can be practiced with modification within the spirit and scope of the claims.

The invention claimed is:

1. A computer-implemented method for determining online content insertion points in an online publication, comprising:
   receiving, by a break point identifying ("BPI") computer device in communication with a memory device, a candidate online publication that includes a plurality of audio segments;
   determining, by the BPI computer device, a threshold proportional to a total length of the candidate online publication;
   comparing, by the BPI computer device, a portion of each of the plurality of audio segments to a plurality of reference audio segments to identify a number of the plurality of audio segments that match one of the plurality of reference audio segments;
   determining, by the BPI computer device and responsive to the number of the plurality of audio segments that match one of the plurality of reference audio segments being above a second threshold, a plurality of break candidates within the candidate online publication;
   determining, by the BPI computer device, a first aggregate time for a first break candidate of the plurality of break candidates, the first aggregate time comprising a duration between the first break candidate and a first prior break candidate;
   determining, by the BPI computer device, the first aggregate time for the first break candidate is less than the threshold proportional to the total length of the candidate online publication;
   excluding, responsive to the first aggregate time for the first break candidate being less than the threshold proportional to the total length of the candidate online publication, the first break candidate as a content insertion point within the candidate online publication, wherein the content insertion point represents a point in the candidate online publication for presenting online content;
   determining, by the BPI computer device, a second aggregate time for a second break candidate, the second aggregate time comprising a time between the second break candidate and a second prior break candidate;
   determining, by the BPI computer device, the second aggregate time for the second break candidate is greater than the threshold;
   selecting, responsive to the second aggregate time for the second break candidate being greater than the threshold, the second break candidate as the content insertion point within the candidate online publication; and
   storing the content insertion point in association with the candidate online publication in the memory device.

2. The method of claim 1, wherein identifying one or more of the plurality of audio segments further comprises:
   storing, in the memory device, the plurality of reference audio segments; and
   scanning the candidate online publication to determine a number of the plurality of audio segments that match any of the plurality of reference audio segments.

3. The method of claim 2, further comprising:
   determining a percentage of the audio segments that match the plurality of reference audio segments; and
   disqualifying the candidate online publication responsive to the percentage of the audio segments that match the plurality of reference audio segments being below the second threshold.

4. The method of claim 1, further comprising identifying the one or more of the plurality of audio segments based on one or more differences between the plurality of audio segments.

5. The method of claim 1, wherein selecting the second break candidate as the content insertion point within the candidate online publication further comprises determining the content insertion point based on at least one of: a number of audio segments in the candidate online publication, a play time of at least one of the plurality of audio segments, a play time of the candidate online publication, a characteristic of at least one of the plurality of audio segments, a request of a publisher associated with the candidate online publication, a request of an owner associated with the candidate online publication, and a jurisdiction associated with at least one of the publisher, the owner, and an end user associated with the candidate online publication.

6. The method of claim 5, further comprising serving an online content item along with the candidate online publication to the end user when the candidate online publication reaches the content insertion point while being displayed to the end user.

7. The method of claim 1, further comprises:
   determining a starting point and a stopping point for each audio segment of the plurality of audio segments;
   determining the plurality of break candidates for the candidate online publication between the stopping point of a first audio segment and the starting point of a second audio segment.

8. The method of claim 7, further comprising:
   determining a segment length for each audio segment of the plurality of audio segments; and
   determining positions for the first break candidate and the second break candidate in the candidate online publication, such that the first break candidate is at least a predetermined length of time from the second break candidate, wherein the positions are based on the segment length of the plurality of audio segments.

9. A break point identifying ("BPI") computer system for determining online content insertion points in an online publication, said BPI computer system comprising one or more processors communicatively coupled to one or more memory devices, said BPI computer system configured to:
   receive a candidate online publication that includes a plurality of audio segments;
   determine a threshold proportional to a total length of the candidate online publication;
   compare a portion of each of the plurality of audio segments to a plurality of reference audio segments to identify a number of the plurality of audio segments that match one of the plurality of reference audio segments;

determine, responsive to the number of the plurality of audio segments that match one of the plurality of reference audio segments being above a second threshold, a plurality of break candidates within the candidate online publications;

determine a first aggregate time for a first break candidate, the first aggregate time comprising a duration between the first break candidate and a first prior break candidate;

determine the first aggregate time for the first break candidate is below the threshold proportional to the total length of the candidate online publication;

exclude, responsive to the first aggregate time for the first break candidate being below the threshold proportional to the total length of the candidate online publication, the first break candidate as a content insertion point within the candidate online publication, wherein the content insertion point represents a point in the candidate online publication for presenting online content;

determine a second aggregate time for a second break candidate, the second aggregate time comprising a time between the second break candidate and a second prior break candidate;

determine the second aggregate time for the second break candidate is greater than the threshold;

select, response to the second aggregate time for the second break candidate being greater than the threshold, the second break candidate as the content insertion point within the candidate online publication; and store the content insertion point in association with the candidate online publication in the one or more memory devices.

10. The BPI computer system in accordance with claim 9, the BPI computer system is further configured to:
store the plurality of reference audio segments; and
scan the candidate online publication to determine a number of the plurality of audio segments that match any of the plurality of reference audio segments.

11. The BPI computer system in accordance with claim 10, the BPI computer system is further configured to:
determine a percentage of the audio segments that match the plurality of reference audio segments; and
disqualify the candidate online publication responsive to the percentage being below a second threshold.

12. The BPI computer system in accordance with claim 9, the BPI computer system is further configured to scan the candidate online publication to identify one or more of the plurality of audio segments based on one or more differences between audio segments.

13. A non-transitory computer-readable storage medium having computer-executable instructions embodied thereon, wherein when executed by a break point identifying ("BPI") computing device having at least one processor coupled to at least one memory device, the computer-executable instructions cause the at least one processor to:
receive a candidate online publication that includes a plurality of audio segments;
determine a threshold proportional to a total length of the candidate online publication;
compare a portion of each of the plurality of audio segments to a plurality of reference audio segments to identify a number of the plurality of audio segments that match one of the plurality of reference audio segments;
determine, responsive to the number of the plurality of audio segments that match one of the plurality of reference audio segments being above a second threshold, a plurality of break candidates within the candidate online publications;

determine a first aggregate time for a first break candidate, the first aggregate time comprising a duration between the first break candidate and a first prior break candidate;

determine the first aggregate time for the first break candidate is below the threshold proportional to the total length of the candidate online publication;

exclude, responsive to the first aggregate time for the first break candidate exceeding the threshold proportional to the total length of the candidate online publication, the first break candidate as a content insertion point within the candidate online publication, wherein each content insertion point represents a point in the candidate online publication for presenting online content;

determine a second aggregate time for a second break candidate, the second aggregate time comprising a time between the second break candidate and a second prior break candidate;

determine the second aggregate time for the second break candidate is greater than the threshold;

select, response to the second aggregate time for the second break candidate being greater than the threshold, the second break candidate as the content insertion point within the candidate online publication; and store the content insertion point in association with the candidate online publication.

14. The non-transitory computer-readable storage medium of claim 13, wherein the computer-executable instructions further cause the at least one processor to:
store the plurality of reference audio segments; and
scan the candidate online publication to determine a number of the plurality of audio segments that match any of the plurality of reference audio segments.

15. The non-transitory computer-readable storage medium of claim 14, wherein the computer-executable instructions further cause the at least one processor to:
determine a percentage of the audio segments that match the plurality of reference audio segments; and
disqualify the candidate online publication responsive to the percentage being below a second threshold.

16. The non-transitory computer-readable storage medium of claim 13, wherein the computer-executable instructions further cause the at least one processor to scan the candidate online publication to identify one or more of the plurality of audio segments based on one or more differences between audio segments.

17. A method for determining online content insertion points in an online publication, comprising:
receiving, by a break point identifying ("BPI") computer device in communication with a memory device, a candidate online publication that includes a plurality of audio segments;
determining, by the BPI computer device, a threshold proportional to a total length of the candidate online publication;
comparing, by the BPI computer device, a portion of each of the plurality of audio segments to a plurality of reference audio segments to identify a number of the plurality of audio segments that match one of the plurality of reference audio segments;
determining, by the BPI computer device and responsive to the number of the plurality of audio segments that match one of the plurality of reference audio segments being above a second threshold, a plurality of break candidates within the candidate online publication;

determining, by the BPI computer device, a first aggregate time for a first break candidate of the plurality of break candidates, the first aggregate time comprising a duration between the first break candidate and a first prior break candidate;

determining, by the BPI computer device, the first aggregate time for the first break candidate is greater than the threshold proportional to the total length of the candidate online publication;

selecting, responsive to the first aggregate time for the first break candidate being greater than the threshold proportional to the total length of the candidate online publication, the first break candidate as a content insertion point within the candidate online publication; and storing the content insertion point in association with the candidate online publication in the memory device.

\* \* \* \* \*